US007203287B2

(12) United States Patent
Turner et al.

(10) Patent No.: US 7,203,287 B2
(45) Date of Patent: Apr. 10, 2007

(54) AUDIO RECORDING SYSTEM AND METHOD OF USE

(75) Inventors: Gerry Turner, Los Alamitos, CA (US); R. Al Morrison, Belmont Shore, CA (US)

(73) Assignee: VoiceCards, Inc., Los Alamitos, CA (US)

( * ) Notice: Subject to any disclaimer, the term of this patent is extended or adjusted under 35 U.S.C. 154(b) by 0 days.

(21) Appl. No.: 10/680,310

(22) Filed: Oct. 7, 2003

(65) Prior Publication Data

US 2004/0066915 A1    Apr. 8, 2004

Related U.S. Application Data

(63) Continuation of application No. 09/969,343, filed on Oct. 1, 2001, now Pat. No. 6,718,013.

(51) Int. Cl.
*H04M 1/64* (2006.01)
(52) U.S. Cl. .................. 379/88.07; 40/124.03
(58) Field of Classification Search ............ 379/88.07, 379/67.1, 88.28, 71, 357, 355, 91, 88.22, 379/68, 88.17; 40/124.03, 124
See application file for complete search history.

(56) References Cited

U.S. PATENT DOCUMENTS

| | | | |
|---|---|---|---|
| 4,791,741 A | 12/1988 | Kondo | |
| 5,045,327 A | 9/1991 | Tarlow et al. | |
| 5,063,698 A | 11/1991 | Johnson et al. | |
| 5,155,760 A * | 10/1992 | Johnson et al. | 379/88.01 |
| 5,166,851 A | 11/1992 | Jacobson | |
| 5,387,108 A | 2/1995 | Crowell | |
| 5,425,078 A | 6/1995 | Stern | |
| 5,444,767 A * | 8/1995 | Goetcheus et al. | 379/67.1 |
| 5,490,206 A | 2/1996 | Stern | |
| 5,491,774 A | 2/1996 | Norris et al. | |
| 5,570,414 A | 10/1996 | Stern | |
| 5,577,918 A | 11/1996 | Crowell | |
| 5,588,678 A | 12/1996 | Young | |
| 5,719,920 A | 2/1998 | Harman | |
| 5,761,836 A | 6/1998 | Dawson | |
| 5,787,151 A | 7/1998 | Nakatsu et al. | |
| 5,812,064 A | 9/1998 | Barbour | |
| 5,826,235 A | 10/1998 | Harman | |
| 5,828,732 A | 10/1998 | Gow | |
| 5,841,878 A | 11/1998 | Arnold et al. | |
| 5,860,065 A | 1/1999 | Hsu | |
| 5,956,682 A | 9/1999 | Loudermilk et al. | |
| 6,011,833 A | 1/2000 | West | |
| 6,035,018 A | 3/2000 | Kaufman | |
| 6,356,626 B1 * | 3/2002 | Ohara et al. | 379/88.22 |

* cited by examiner

*Primary Examiner*—Gerald Gauthier
(74) *Attorney, Agent, or Firm*—Fulwider Patton LLP

(57) ABSTRACT

An audio message recording and playback system including a recorder-imprinter device, a self-contained voice module for playback of an audio message and a number of input devices for initially recording the audio message to the recorder-imprinter device.

17 Claims, 8 Drawing Sheets

AUDIO RECORDING SYSTEM AND METHOD OF USE

This application is a continuation of U.S. patent application Ser. No. 09/969,343, filed on Oct. 1, 2001, and now U.S. Pat. No. 6,718,013 which is incorporated herein by reference in its entirety.

BACKGROUND OF THE INVENTION

1. Field of the Invention

The present invention relates to recording and playback of personalized audio messages. More particularly, the present invention relates to the devices and methods employed in recording a personalized greeting onto a voice message playback module to be sent to a recipient along with a card, gift or other product.

2. Description of the Prior Art

As modem conveniences have increased, so have the pace of life and the distances between loved ones, friends and business associates. People have become more transient, and a truly global marketplace has emerged. Due to the rapid technological advancements of recent years and the associated changes in how people conduct their personal and business affairs, the general public's interest in buying and obtaining products and information remotely has significantly increased commensurately. On a personal level, today many people often buy gifts through long distance telephonic retail services or over the internet. As a result, the gift giver may never see or touch the gift, which is typically sent directly from a warehouse or retail store to the intended recipient, much less be able to add a "personal touch" to the gift of any kind. In the business world, as well, it is often the case that products or information are sent to a customer directly from a third-party supplier without a truly personal touch from the sending party. For businesses to gain and keep customers in today's competitive marketplace, a personal touch may be the deciding factor. Therefore, in both the personal and the commercial context, it is often desirable to provide a custom, personalized voice message with a gift, product or other information being sent to a recipient.

To this end, several voice message recording systems have been contemplated in the art. For example, U.S. Pat. Nos. 5,719,920 and 5,826,235 disclose a system for remote recording of a personal audio greeting as compressed, digital data onto a "communication package." With this system, the greeting is stored in the programming device, or "unitized interface system," and then provided to the communication package as compressed, digital data; thereby necessitating that the circuitry of both the unitized interface system and the communication package contain components needed to transmit and store this compressed, digital data, causing the system to be relatively more complex, expensive and physically larger.

U.S. Pat. Nos. 5,425,078 and 5,490,206 disclose a method and system for recording an audio message onto a "keepsake" playback device through the use of a remote, computerized voice mailbox system. This system involves a programming device, or "subscriber set" that cannot itself store messages or be accessed directly. Rather, the vendor where the subscriber set is located must call the voice mailbox system to download the previously-recorded message directly to the keepsake. Thus, this system does not allow a customer on-site where the gift or card is located to conveniently record a personal greeting to a keepsake to be placed with the customer's purchase. Moreover, the customer cannot call into the subscriber set directly, but must always go through the voice messaging system and rely on the vendor to subsequently make the transfer to the keepsake. Therefore, the system disclosed by these patents is limited to only one means for a customer to record a personal voice greeting.

Finally, other examples of voice message recording systems known in the art include U.S. Pat. No. 5,063,698, which proposes that a customer's personal audio message be recorded from an answering machine onto a separate voice chip, or read-only memory device, that would then be inserted into a greeting card having the balance of the electronics for playback of the message pre-installed in the card, while U.S. Pat. No. 5,444,767 proposes that the entire voice message playback circuitry be pre-installed in a greeting card, ornament, stuffed animal, or the like. Thus, with these systems, all or a portion of the voice message playback circuitry is pre-installed in the card, gift or product being sent to a recipient, causing these systems to be bulky, inflexible and less adaptable to the needs of individuals and businesses alike.

SUMMARY OF THE INVENTION

The present invention provides for an economical, convenient and easy-to-use audio message recording and playback system. The system includes a recorder-imprinter device and a self-contained voice module for storage and playback of a personalized audio greeting that can be inserted into a variety of cards, ornaments or products.

The recorder-imprinter device of the present invention is a stand-alone machine configured with both a handset for on-site recording of a personal audio greeting and a conventional telephone jack and circuitry for interfacing with a telephone network so that a customer's call can be connected directly to the device and an audio greeting recorded remotely. In either case, the recorder-imprinter's microprocessor and pre-installed operational and voice prompting software guides the customer through the voice message recording process. When the audio message has been saved to the recorder-imprinter's solid state memory and the customer has replaced the handset or ended his call, the message remains stored in the recorder-imprinter until it is subsequently transferred to a voice module.

In an alternative embodiment, a personal computer is employed in the transfer of an audio message to or from the recorder-imprinter device via conventional e-mail or internet means. Software is provided for use in conjunction with this embodiment that is easily installed on the conventional personal computer and provides point-and-click operational modes for the recording, storage and downloading and uploading of audio message files. The personal computer may be located on-site with the recorder-imprinter or remotely, but in either case may be linked to the recorder-imprinter over a conventional computer network via a serial or USB connection. The audio message file downloaded from the computer is inherently digital and is stored in digital format in the RAM of the recorder-imprinter. In the case of inputs from the handset on the recorder-imprinter or a remote telephone call, the audio message is initially in analog format. Thus, the recorder-imprinter is equipped with an analog-to-digital converter so that the audio file may still be stored in digital format. Then, when the audio message is processed through the recorder-imprinter for transfer to the voice module, the file is converted to analog by a digital-to-analog converter before being sent to the voice module.

The voice module of the present invention consists of a single circuit board housed within a plastic casing so that its overall size is approximately 1.25"×1.25"×0.25". At the heart of the voice module's circuitry is a miniature solid state chip through which the other electrical components are wired so that the chip completely controls the module's operation. The voice module's power supply is in circuit with a switch and a timing device, both of which serve to reduce power draw while the voice module is idle. When the switch is actuated, audible playback of the audio message is effectuated through a speaker contained within the voice module. Ultimately, because of the voice module's small size, independent operation, electronic simplicity and low cost, it is optimally suited for use in a wide variety of cards, gifts and other products to be sent to an intended recipient.

In use, a personal greeting may be sent to a recipient employing the audio recording and playback system of the present invention in a few simple steps. A customer first records his or her greeting in the memory of a store's recorder-imprinter device by going to the store and using the device's handset, being connected to the device through a remote telephone call to the store, or being transferred through a personal computer, either in the store or at another location. Once the personal greeting is stored in the memory of the recorder-imprinter, a voice module is inserted into the programming port where electrical contacts removably engage an electrical receptacle in the port across which data can be exchanged. The voice module can only be fully inserted one way due to complemental indexing surfaces on the voice module and in the programming port. Immediately after the voice module is inserted in the programming port, the recorder-imprinter is put into programming mode by the operator and the desired greeting is selected from the recorder-imprinter's memory and recorded onto the voice module. When recording is completed, the voice module is removed and placed in a pre-formed pocket in the selected card, gift or other product being sent to the recipient. Thus, the audio recording and playback system of the present invention is flexible and convenient to use and produces a small, self-contained voice module for playback of a personal greeting accompanying a wide variety of personal and commercial items.

Other features and advantages of the invention will become apparent from the following detailed description, taken in conjunction with the accompanying drawings, which illustrate, by way of example, the features of the invention.

DETAILED DESCRIPTION OF THE PREFERRED EMBODIMENTS

As shown in the drawings for purpose of illustration, the present invention provides for an improved personal voice message recording and playback system that is generally comprised of a recorder-imprinter device 21 (FIG. 1) and a miniature voice module 120 (FIGS. 8 & 15) for portable storage and playback of a personal audio greeting.

The recorder-imprinter device 21 of the present invention functions to temporarily store personal audio greetings in its solid state analog memory for subsequent transfer to the permanent memory of the voice module 120, as will be discussed in detail below. The recorder-imprinter is optimally configured with a number of different input means for recording the personal audio greeting into the memory, making the device multi-functional and adaptable to the needs of all types of businesses.

Figure 1:
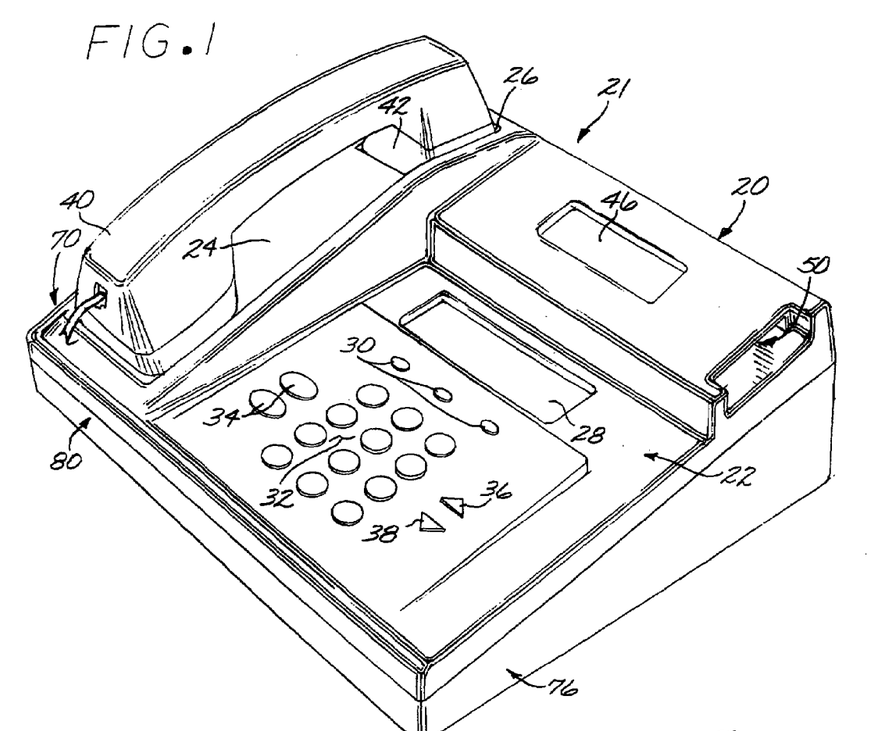
FIG. 1 is a perspective view of a recorder-imprinter device embodying the present invention.

Referring now to FIG. 1, the recorder-imprinter 21 is a stand-alone unit generally configured in size and shape much like the conventional combination telephone and answering machines known in the art. In this way, the recorder-imprinter is aesthetically-pleasing and small in size, so that the device can be easily and conveniently placed at a retail store's front counter, on a shelf or desk or other display, mounted on a wall, or at any other location where the device is usable and accessible to the store clerk and customers alike. The recorder-imprinter is housed in a housing 20 of molded plastic, such as polycarbonate, acrylic, polyethylene, or other such attractive, durable plastic known in the art. As a molded article, the housing is configured with graceful lines and rounded corners as well as the other functional features necessary to the recorder-imprinter's operation and may be made in a variety of colors to suit a particular business's decor or application.

The top wall 22 of the recorder-device housing is formed on its top side with a lengthwise, raised cradle 24 (FIG. 1) along its leftmost portion for complimentary receipt of a telephone handset 40. The cradle is configured at its upper extremity with a deeper recess 26 to accommodate the handset earpiece 42, the recess being further configured at its lower extremity with a hooked lip, as known in the art, for engaging a corresponding relief in the handset earpiece so as to secure the handset in the cradle when the recorder-imprinter is installed vertically, as on a wall. The central right portion of the top wall 22 is generally flat and configured with an arrangement of cut-outs, or windows, accommodating a visual display strip 28, three soft key function selection buttons 30 symmetrically spaced-apart and centered beneath the visual display strip, and a numeric keypad 32 centered below both the display strip and the selection buttons. The keypad also includes two operation-mode command buttons 34, an up-arrow button 36 and a down-arrow button 38.

With continued references to FIG. 1, the top right portion of the top wall 22 is raised to form a trans-wire rail which opens to the right to form a rectangular interface port 50 is for removable receipt of the voice module 120. The port is generally a rectangular recess configured in size and shape to accommodate insertion of the voice module. The interaction between the voice module and the recorder-imprinter through the port is described in more detail below. The upper surface of the rail is formed generally centrally with a recessed rectangular pocket 46 that may accommodate an advertising label or customer service contact information, such as a toll-free telephone number or web address.

Figure 2:
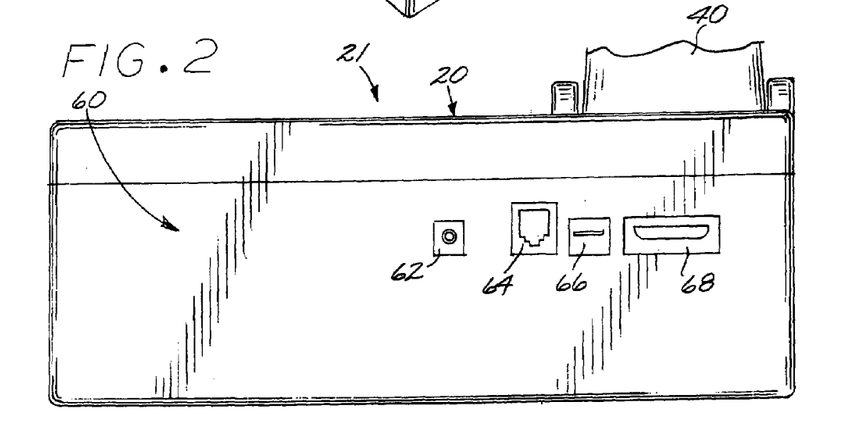
FIG. 2 is a back view, in enlarged scale, of the recorder-imprinter device of FIG. 1.
Figure 3:
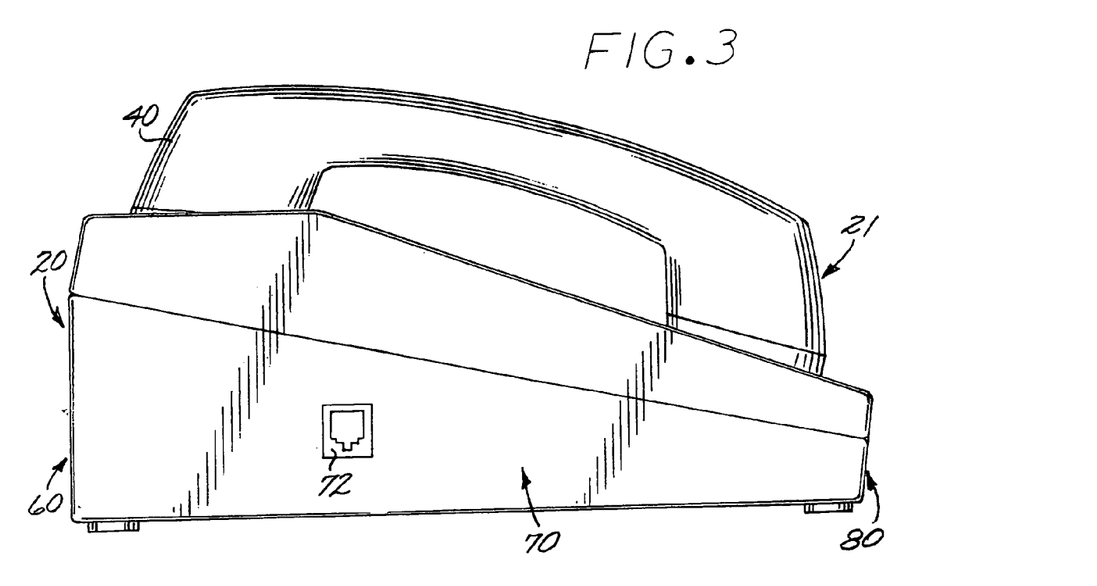
FIG. 3 is a left side view of the recorder-imprinter device of FIG. 2.
Figure 4:
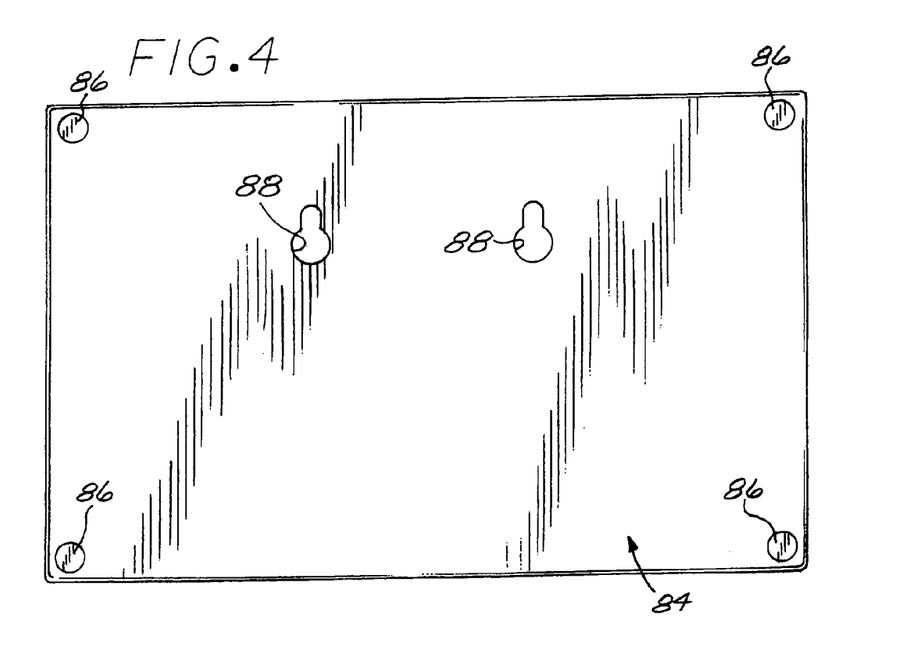
FIG. 4 is a bottom view, in reduced scale, of the recorder-imprinter device of FIG. 1.

With reference now to FIG. 2, the recorder-imprinter housing is formed with a back wall 60 configured with four sockets defining a power cord input connection 62, a first conventional telephone jack 64, a USB port 66 and a serial COM port 68, each being typical and known in the art. This first telephone jack 64 is provided for parallel connection of the recorder-imprinter 21 to the local telephone network using a conventional telephone cord with a "splitter" device, and a second telephone jack 72 (FIG. 3) is provided for connection to a conventional telephone cord to the handset 40 for use in on-site recording. The COM port and the USB port are provided for alternative connection means to a personal computer using a conventional serial cable or USB cable, as required, for the exchange of pre-recorded voice message files between the computer and the recorder-imprinter. The power cord input connection consists of a male pin configured to accommodate a female plug on one end of a power transformer cord. At the opposite end of the 12-volt DC power transformer plug is a conventional two- or three-pronged plug for insertion into the typical 110-volt wall electrical outlet.

Figure 5:
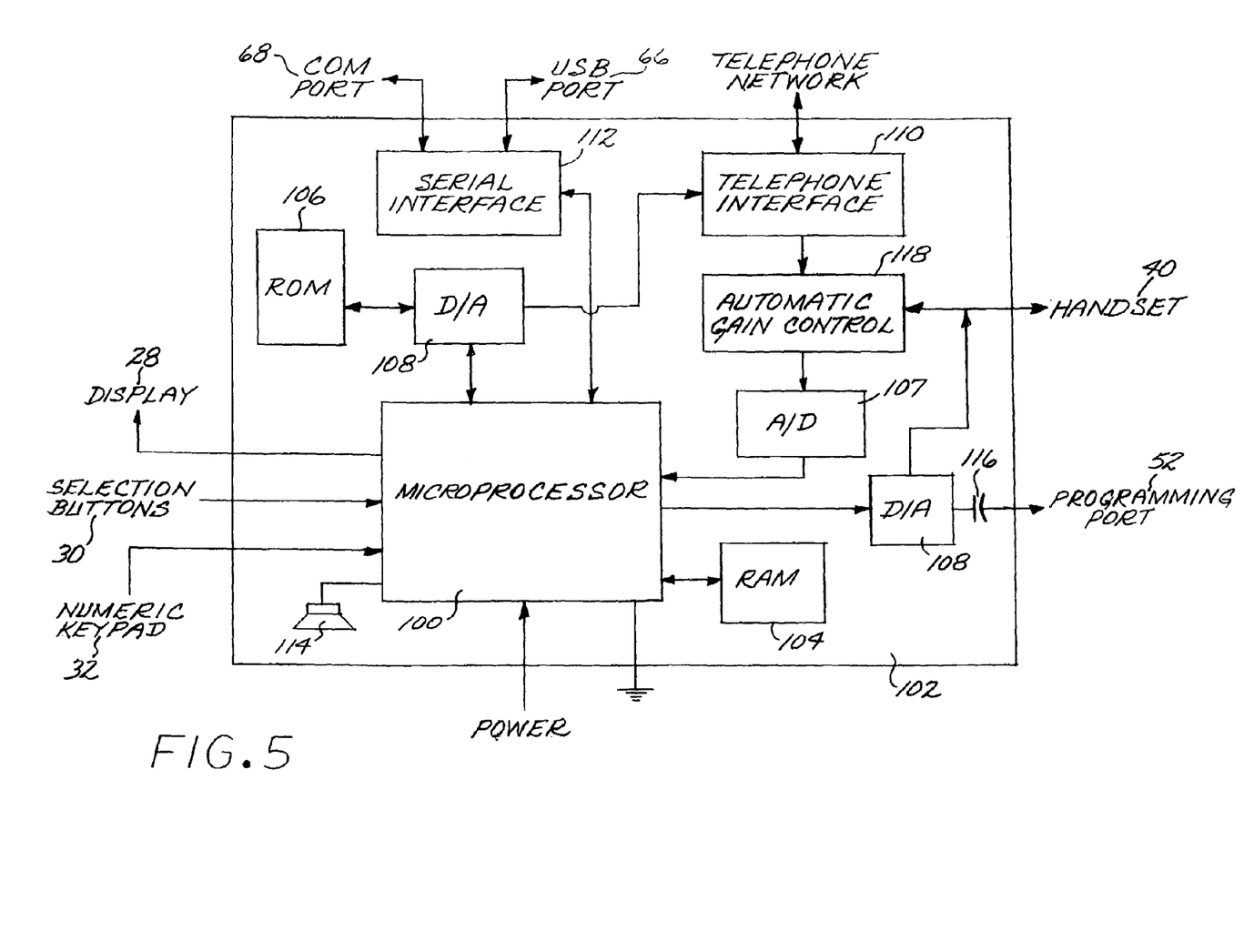
FIG. 5 is a block diagram of the primary electrical components included the recorder-imprinter device of FIG. 1.

With reference now to FIG. 5, internally, at the heart of the recorder-imprinter device 21 is a microprocessor 100 that directs all modes of the device's operation. The microprocessor is mounted on a conventional circuit board 102 as known in the art for safe and reliable electrical connection with the other components of the recorder-imprinter's circuitry. Two types of non-volatile memory devices are incorporated in the recorder-imprinter circuit. First, a solid state random access memory ("RAM") storage device 104 is provided for the temporary storage of data files representing a customer's voice message and order number. Second, a read only memory ("ROM") device 106 is provided for permanent storage of the recorder-imprinter's operating program and digitized voice prompt data. In the preferred embodiment, the RAM storage device 104 stores the data files in digital format, rather than analog, is provided in the recorder-imprinter's circuitry so that the data can be compressed, as is known in the art. In this case, the recorder-imprinter will necessarily include both an analog-to-digital ("A/D") converter 107 for conversion of incoming analog customer audio messages, as through the local handset or a remote telephone connection, and a digital-to-analog ("D/A") converter 108 for converting the digitized audio messages back to analog for storage in a voice module 120.

Since the recorder-imprinter is capable of receiving voice data files from multiple sources, including transmission from a personal computer wherein the files are inherently digital, even if the RAM storage device is solid state (analog), a D/A converter will still be necessary to convert incoming digitized files to analog format for storage and subsequent transfer to a voice module. It is further noted that a D/A converter is required in the circuit anyway because the digitized voice prompts stored in the ROM device must be converted to analog for playback to the customer through the handset or over the telephone line.

With continued reference to FIG. 5, the recorder-imprinter 21 is also configured with a telephone interface circuit 110 for connection to a public switched telephone network and a serial interface circuit 112 for connecting to a personal computer through either the COM port 68 or USB port 66. The interface circuits are electrically connected on the recorder-imprinter's circuit board 102 across the appropriate pins of the microprocessor 100. The recorder-imprinter's circuitry further includes connections to the display device 28, which can be an LCD or vacuum fluorescent display, the soft key selection buttons 30, the numeric keypad 32, and an audible "help" indicator 114, which is a small speaker.

Finally, the circuitry of the recorder-imprinter 21 includes the interface port 50 (FIG. 13) mentioned above and which, again, will be described in more detail below as it relates to the operation of the recorder-imprinter in transferring a voice message to a voice module 120. At this juncture, though, it is important to note that the multi-contact female electrical receptacle 52 within the interface port is wired to the recorder-imprinter circuit and across the appropriate pins of the microprocessor 100 so that power and data can be shared across the contacts with the voice module. Moreover, secondary electrical components necessary for data transmission and analog filtering, such as a 0.1 μF capacitor 116 (FIG. 5), are shared by the voice module across one of the receptacle's contacts so as to minimize the number of components in the voice module itself, again contributing to the goal of the present invention of making the overall system, and in this case the voice module particularly, smaller, less complex and more reliable. Relatedly, the recorder-imprinter circuitry is designed to prevent overloading the microprocessor and to minimize background noise distortion by incorporating an automatic gain control circuit 118 (FIG. 5). With each of the recorder-imprinter's electrical components connected in circuit and operating through the central microprocessor, the microprocessor is operable to control the flow of data in and out of the recorder-imprinter through the various interface devices.

Figure 6:
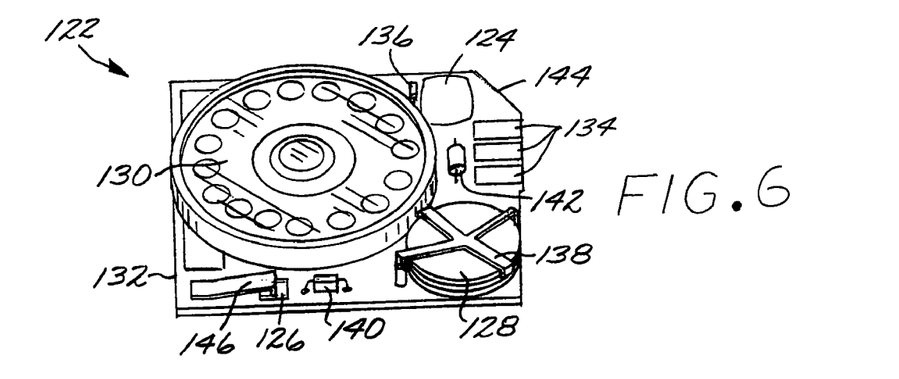
FIG. 6 is perspective view of a voice module circuit board included in a voice module utilized with the device shown in FIG. 1 but in enlarged scale.
Figure 7:
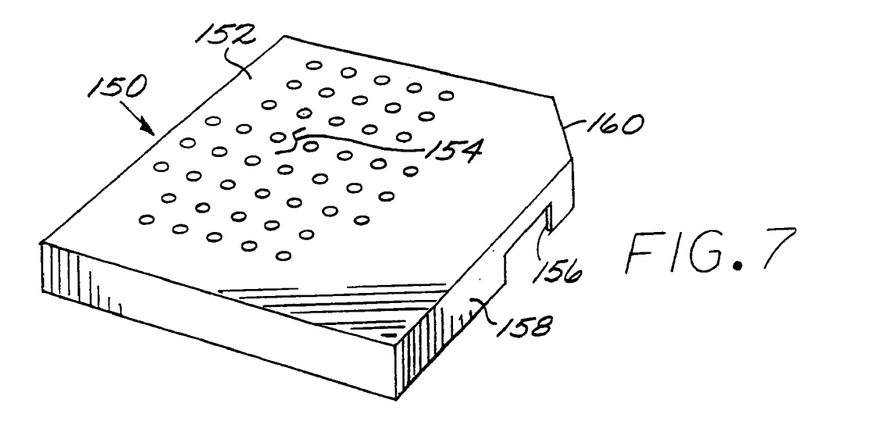
FIG. 7 is a perspective view of a cap employed in encasing the board shown in FIG. 6.
Figure 8:
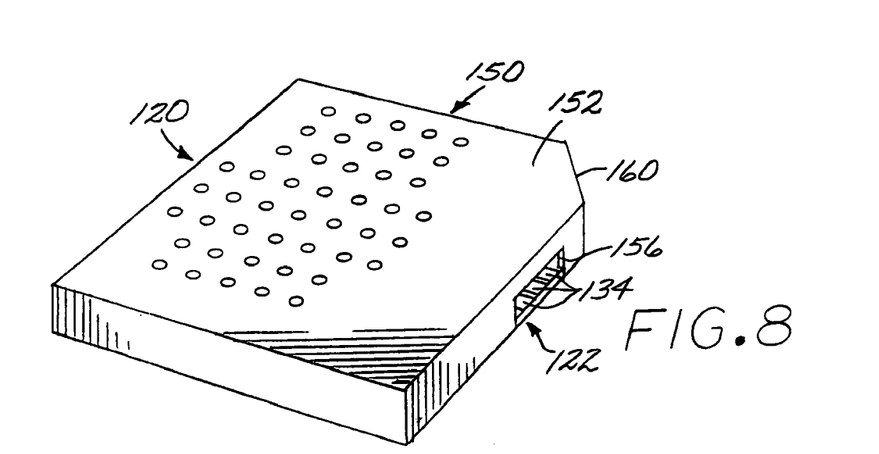
FIG. 8 is a perspective view of the voice module cap shown in FIG. 7 installed on the board shown in FIG. 6.

Referring now to FIGS. 6–8, the voice module 120 of the present invention is a self-contained electronic device for storing and audibly playing back a voice message provided by the sender and recorded onto the voice module through the recorder-imprinter interface port 50. The circuitry 122 of the voice module includes a programmable chip 124 (or controller), a switch 126, a power supply 128 and a speaker 130. Just as for the recorder-imprinter 21, the chip is the heart of the voice module electronics and controls its operation. The chip preferably employed in the voice module incorporates an analog RAM storage device that is non-volatile, or permanently stores the voice message transferred to the voice module. One such chip that may be employed is an ISD-1420 solid state chip manufactured by Information Storage Devices Corporation in Sunnyvale, Calif. The chip and the other voice module components are mounted on a single circuit board 132 and are electrically connected in circuit using techniques of prefabrication and soldering known in the art. Thus, the chip is in circuit with the power supply, switch and speaker to control the playback of a previously recorded voice message stored in the chip's solid state memory. In order to record a voice message into the memory of the voice module, the circuit is equipped with several contact plates 134 configured to electrically interface with several contact surfaces 52 (FIG. 12) of the recorder-imprinter's interface port 50 (FIG. 1 & 11) when the voice module is nested in the port. The details of this recording process are described below.

With continued reference to FIG. 6, the voice module circuitry 122 includes a power supply 128 which may be DC batteries or other such power source known in the art. In one embodiment, the power supply consists of four DC batteries in series (stacked). The batteries are held in position and positive and negative electrical contact made across them through the use of a beryllium copper battery clip 138. Aside from the switch 126 being in circuit between the power supply and the chip 124 in order to conserve power when the voice module is not in use, the circuitry is also equipped with a timing device 136, connected between the power supply and the chip in order, when the circuit is open, to regulate power draw while the voice module is idle, particularly after the voice module memory has received a voice message and is still connected to the recorder-imprinter 21 through the interface port 50. The timing device thus works in concert with the switch to maximize the life of the power supply. Finally, the voice module circuitry includes film or carbon resistors: resistor 140 in circuit between the switch and the chip and resistor 142 in circuit between a contact plate 134 and both the switch and the chip.

Referring now to FIG. 7, a plastic casing 150 is provided to house the voice module circuitry 122, thereby protecting both the components and the user and making the finished voice module 120 more attractive and functional. The plastic casing may be molded from a variety of suitable materials, including polyethylene, polypropylene or K-Resin, and in a variety of colors. The casing is essentially a lid for the circuit board having a top 152 and four sides. In a preferred embodiment, the circuit board 132 and casing are generally square, with the overall outside dimensions of the casing being approximately 1.25"×1.25". The inside dimensions of the casing correspond to the outside dimensions of the voice module circuit board so that when the circuit board is seated within the casing such that its bottom surface is flush with the bottom edge of the casing's sides, it is secured in place through an interference or snap fit between the perimeter edges of the board and the inside surfaces of the casing sides. During assembly, the circuit board may be further secured within the casing by applying an adhesive along the contacting surfaces. As assembled, the thickness of the voice module is approximately 0.25".

Figures 12, 13:
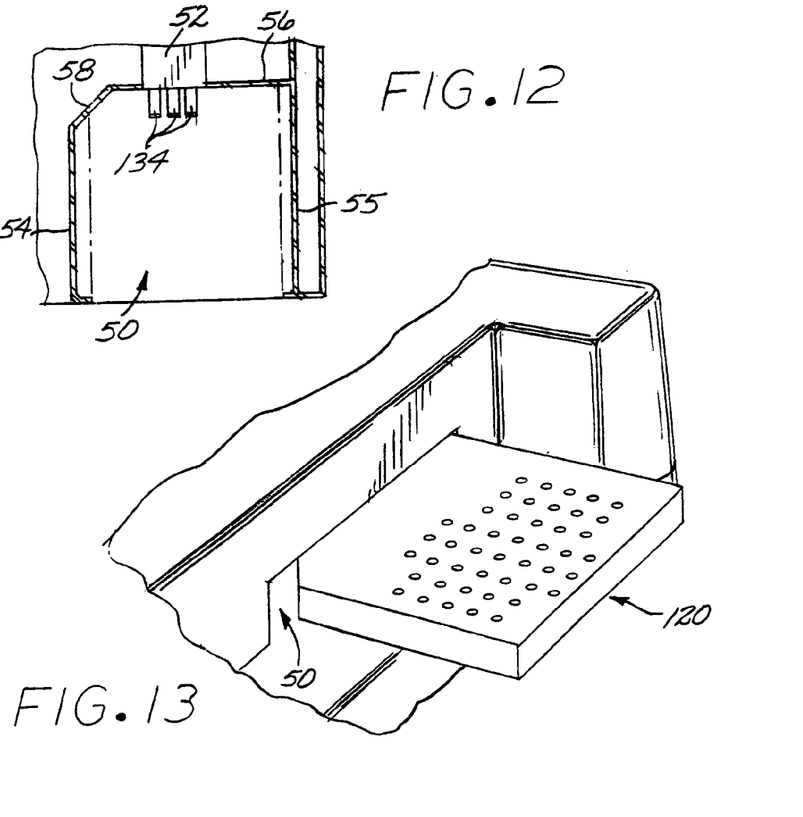
FIG. 12 is a horizontal sectional view, partially in section, taken along line 12—12 of FIG. 11.
FIG. 13 is a perspective view, in enlarged scale and partially in section, of the voice module of FIG. 8 partially inserted into the programming port of the recorder-imprinter device of FIG. 11.

The voice module casing 150 is formed on its top 152 with a pattern of small holes 154, each on the order of 0.05". This hole pattern is positioned in the top surface such that when the circuit board 132 is installed within the casing, the speaker 130 is located immediately beneath and adjacent the hole pattern for communication of sound. Thus, sound from the speaker 130 is communicated through such holes to be propagated to the recipient of a gift product housing the module to thereby optimize the acoustical quality and the listener's enjoyment of the personal audio greeting. Referring to FIGS. 7, 8 and 12, the casing is further formed on one side 158 with a small rectangular cut-out 156 for receipt of respective electrical prongs 134 (FIG. 12) projecting into the interface port 50 for electrical engagement thereof.

With continued reference to FIGS. 6–8, one single corner of the voice module casing is formed with a 45° chamfer at to create a diagonal indexing wall 160. Viewing the assembled voice module 120 from above, or looking down on the casing's top surface 152, as shown in FIG. 8, the diagonal wall is formed in the corner counter-clockwise from the rectangular cut-out 156. As shown in FIG. 6, the corner of the circuit board 132 counter-clockwise from the contact plates 134, as viewed from above, is cut to create a diagonal edge 144 that corresponds to the inside surface of the diagonal wall 160 of the casing to facilitate installation of the circuit board within the casing. As will be described in more detail below, in use, the diagonal wall serves to help orient the voice module when it is inserted into the interface port 50 of the recorder-imprinter 10. It will also be appreciated that the diagonal wall serves to orient the casing on the circuit board, so as to properly position the speaker 130 beneath the hole pattern 154.

Playback of the voice message stored in the memory of the voice module chip 124 is initiated when voice module switch 126 is closed to complete the power circuit and allow current to flow from the power supply 128 to the chip, thereby starting the voice message playback cycle. The switch is simply a leaf-spring-type contact, or the like, that, when depressed, closes the circuit. In order for the user to close the switch, which is internal and inaccessible when the casing 150 is installed over the voice module circuit board 122, a manual actuator 146 is installed in mechanical relationship with the switch itself. The manual actuator is preferably a molded piece of silicone rubber, or other non-flammable composite material, configured such that when the actuator is installed on top of the switch and the casing is installed on the circuit board, the actuator is flush with the inside surface of the casing's top 152 so as to create a mechanical linkage between the switch and the casing's top. It will be appreciated by those skilled in the art, then, that a downward force applied to the outside of the casing at a marked location corresponding to the internal position of the actuator will be transmitted by the actuator to the switch in order to begin playback. Thus, the orientation of the casing on the circuit board is also important in aligning the manual actuator with the corresponding marked depression area 211 (FIG. 15) on the casing's top surface so that a user can reliably and easily initiate playback.

Audible playback of the stored voice message is effectuated through the speaker 130 connected in circuit with the chip 124. At full power, the speaker is capable of delivering audible sounds of up to 80 db without additional amplification. An amplifier may be provided within the voice module circuit to further increase the volume of the audible output. The cooperation of the speaker's improved audible output and the hole pattern 154 above the speaker for free passage of the sound waves from the speaker to the listener help to insure clear and loud playback of the personal audio greeting stored in the voice module 120.

In the preferred embodiment, then, the voice module 120 of the present invention stores and plays back voice messages by employing a small and streamlined circuit, including a miniature solid state chip 130 that controls the operation of the voice module.

The present invention also provides a personal voice message recording and playback system that is flexible and adaptable to many business needs by allowing for numerous means to store a voice message in the recorder-imprinter device 21 for subsequent transfer to the voice module 120. In a first embodiment, a recorder-imprinter device is located in a retail store, such as a flower or gift shop. Such recorder-imprinter is relatively low in cost and small in size because of its streamlined electronics and use of well-established technologies, making it practical for most any retail store owner to procure the voice message system of the present invention and incorporate the system in his or her businesses. Furthermore, since the recorder-imprinter is essentially a stand-alone device and does not require any additional hardware or software installation to use, it is all the more cost-efficient and is easy to set up and put into everyday use for the small business owner and large distributor alike.

Figure 9:
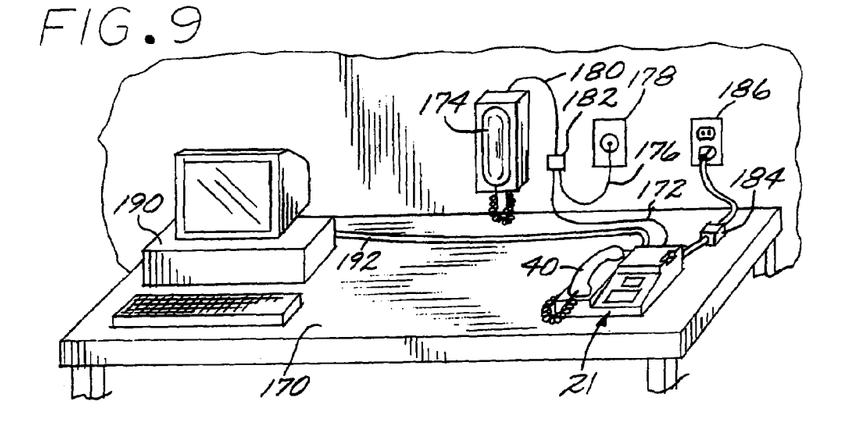
FIG. 9 is a perspective view in a reduced scale of an audio message recording system in circuit with the recorder-imprinter shown in FIG. 1.

Referring now to FIG. 9, to set up and configure the recorder-imprinter device 21 of the present invention for immediate use, only a few simple steps must be taken. Once a location for the recorder-imprinter has been selected and the device is in position, for example, on a counter 170, a long telephone cord 172 packaged with the device is plugged into the telephone jack 64 (FIG. 2) on the back of the device and the other end of the cord is run to a nearby store telephone 174. The incoming line 176 that connects the existing store telephone to a wall telephone jack 178, which is part of a conventional telephone network, is then briefly unplugged and, in place of the incoming line, a short telephone cord 180, also provided with the recorder-imprinter, is plugged into the telephone. At the free end of the short telephone cord a splitter device 182 that is also provided is plugged in. Then, the incoming line that was moments earlier unplugged from the telephone is plugged into one side of the splitter device and the free end of the long telephone cord running from the recorder-imprinter is plugged into the other side of the splitter device. The existing store telephone is again on-line and should have a dial tone when the handset is picked up. The handset 40 is then plugged into the telephone jack 72 (FIG. 3) on the side of the device and power supply transformer 184 plugged into the power cord input connection 62 (FIG. 2) at the back of the device to connect to a 110-volt wall plug 186. Once power is supplied to the recorder-imprinter device, it will automatically assume its "ready" mode available for immediate use.

In use, when a customer calls the shop to order a gift, or perhaps flowers in the case of a flower shop, to be sent to a recipient, the order information will be taken down and the shop clerk will offer the additional service of sending with the flowers a personalized voice message greeting card incorporating the voice module 120 (FIG. 8) of the present invention. If the customer accepts, the clerk will then provide the customer with some general instructions and transfer the call to the recorder-imprinter 21 by pressing the appropriate selection button 30 (FIG. 1) under the word "PHONE" on the recorder-imprinter's display 28 (FIG. 1). The recorder-imprinter will prompt the shop clerk to enter the customer order number and then prompt the customer through the voice message recording process. The prompts provided by the recorder-imprinter are audible and are transmitted in analog format through the telephone line 172 hooked up to the device and then through the splitter device 182 and incoming line 176 across the telephone network to the remote customer. The operational program will provide the prompting and control the entire recording process from the pre-installed ROM memory device 106 (FIG. 5) to control the microprocessor 100 (FIG. 5). Once the customer has completed recording, the message is automatically played back, and the customer then has the opportunity to accept, re-record, or call the clerk for help. In the latter case, an audible prompt 114 (FIG. 5) notifies the clerk that there is some problem, and the clerk can retake the customer's call by simply pushing the selection button under the word "OK" on the display and picking up the handset of the store telephone 174 to speak with the customer.

Once the customer successfully completes recording, the recorder-imprinter 21 automatically hangs up to release the telephone line. The customer's unique personal greeting will then remain in the RAM device 104 (FIG. 5) of the recorder-imprinter associated with the customer's order number until the message is saved to a voice module 120 (FIG. 8) and subsequently deleted. Only recording of a new voice message under the same customer order number will overwrite the stored voice message file. The memory of the recorder-imprinter is designed to store up to a fixed number of voice messages (50, 100, etc.), depending on how the RAM device is configured. Moreover, as discussed in more detail below, when the recorder-imprinter is connected to a personal computer 190 (FIG. 9) running the voice message system software, files representing the voice messages and customer order numbers stored in the memory of the recorder-imprinter may be uploaded to the computer for transfer to another remote PC or recorder-imprinter or for long-term storage, as for archiving purposes.

Figure 10:
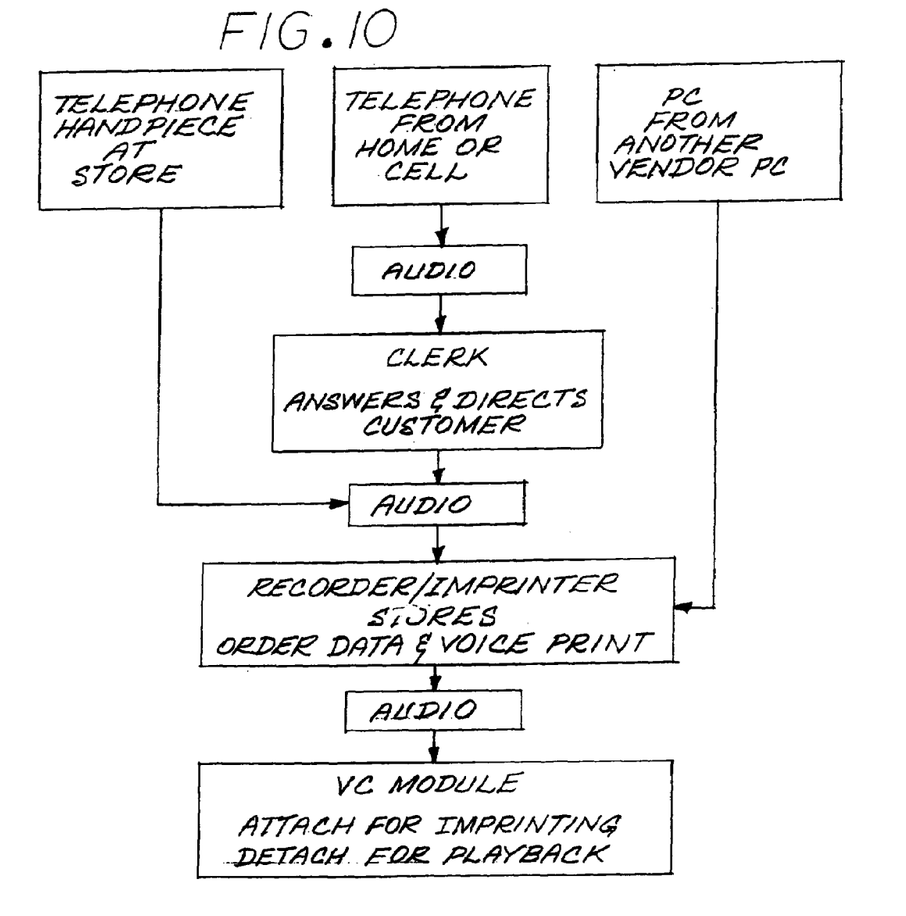
FIG. 10 is a schematic showing the steps of recording an audio message to the recorder-imprinter device of FIG. 1 and subsequently to the voice module of FIG. 8.

Similar to the recording of a voice message from a customer at a remote location, a second embodiment of the present invention involves the situation in which a customer in a store or office desires to send a voice module 120 having a personalized audio greeting along with his or her purchase. In this case, the customer may simply lift the handset 40 of the recorder-imprinter 21 and follow the prompts from the device as above. The customer order number can be selected by the customer (sender) or provided by the operator helping the customer with the purchase. For convenience during in-store or in-office recording, the recorder-imprinter's display 28 (FIG. 1) indicates the number of seconds remaining for the recording and instructs the customer to press the selection button 30 under the word "SAVE" on the display should they complete recording before the allotted time is up. Typically, the customer's voice message may be up to 20 seconds. A flow diagram representing the basic processes of a customer interfacing with the recorder-imprinter through a remote telephone connection or through the recorder-imprinter's handset, as well as through a personal computer, which is discussed in detail below, is shown in FIG. 10.

With reference again to FIG. 9, a third embodiment of the voice message recording and playback system of the present invention for storing a voice message in the recorder-imprinter 21 entails the use of a personal computer 190 in the local or remote recording of an audio message. To prepare the recorder-imprinter for use in this context, the computer or computer network is simply connected to the recorder-imprinter device by plugging a cable 192 into the serial port 68 or the USB port 66 (FIG. 2) on the back of the device, depending on the configuration of the personal computing system with which the device will be interacting.

In accordance with the present invention, software has been developed to run on the Windows platform of the typical personal computer in order to support the interaction of the computer 190 with the recorder-imprinter device 21. This software, or driver, allows the personal computer to recognize and store voice message files and provides for a number of file utility functions, including transferring to and from the recorder-imprinter. The transfer of voice message files is facilitated by the software's interaction with conventional computer network systems and software, such as e-mail and local area networks. The software is typically packaged with the voice message recording and playback system and is installed by the user on the computer's hard drive in the conventional manner from either a 3½" floppy diskette or a CD-ROM provided with the recorder-imprinter system.

Once the software has been installed on the personal computer 190 and has been run from the "Start" menu or by double-clicking on the software's "Desktop" icon, a home screen appears that provides several point-and-click options. One option allows the user to operate the recorder-imprinter remotely, while another option would allow the user to create a voice file using the computer's own hardware; i.e., the computer's keyboard, microphone and sound card. The software provides audio and/or text prompts to guide the user through the entry and recording of information, including the personal greeting itself. Another option provided by the software allows the user to view all voice message files by order number that are currently stored in the computer. A fourth option provided is to then open one or more of the voice message files and send selected files to a recorder-imprinter 21 over a conventional computer network utilizing the serial or USB cable 192 installed at the back of the recorder-imprinter. Thus, a customer can interact with a personal computer at the same location as the recorder-imprinter to actually create a unique voice message or to download a previously recorded message.

In use with the personal computing embodiment of the present invention, a customer might call in to a larger operation such as a catalog distributor or a department store to place a gift order. After placing the order, the customer is asked if he or she would like to send a personalized voice message greeting card with their order. If the customer responds affirmatively, the operator will then transfer the call to an on-site personal computer that is running the voice message software, as through a local network or a modem connection. Once the customer's call has been connected to the computer, as discussed above, the software will then take over and prompt the customer through the voice message recording process. As with on-site recording, the customer enters his or her unique order number as provided by the operator, which links the voice message to the purchase. After the message has been successfully recorded and stored in the computer's memory, at some point later, a clerk or operator at the personal computer would initiate the download of the customer's voice message file to the appropriate recorder-imprinter using the software on the personal computer. With the recorder-imprinter device properly connected to the computer system through either the serial or USB port, the file transfer can take place without the involvement of the clerk at the distribution center where the recorder-imprinter is located, unlike the telephone interface discussed above. Information about the gift order and which order corresponds to which customer order number and voice message may be communicated to the remote location via any of several means of communication, including e-mail, fax and telephone.

A fourth embodiment of the present invention wherein a voice message may be stored in the memory of a recorder-imprinter device 21 involves the exchange of this information between two such devices. Thus, a sender's voice message file that has been recorded and stored in a recorder-imprinter at a first location, as when a customer walks into a store or calls a store and desires to send a personalized voice module with a gift purchase, may be transferred to a recorder-imprinter at a second location where the voice message will then be transferred to a voice module to accompany the gift or card being sent to a recipient. This embodiment is particularly well-suited for the situation in which a customer is at or has called one location of a store chain and desires to purchase and send a gift that is out of stock at that store but is in stock at another store. In this case, if both the store where the customer is located and the store where the gift is located have a recorder-imprinter, the customer can record his personal voice message locally in the store where he is and then have a clerk transfer the recorded message to the recorder-imprinter at the store where the gift is in stock. To facilitate the transfer of the file to the second, remote recorder-imprinter, the clerk will simply notify the other store and ask the clerk at that store to configure the remote recorder-imprinter for the transfer. In the alternative, the transfer between store locations can be facilitated through a personal computer as described above. Or, in the case where a sender has called a first store, the clerk can transfer the phone call to the second store where a clerk there could connect the sender to a recorder-imprinter at that location for the sender to record a personal greeting to accompany his or her purchase.

In any of the above embodiments, ultimately, the customer's order number and voice message is stored as a voice message file in the RAM device 104 (FIG. 5) of the recorder-imprinter 21 at the location where the customer's voice message is to be recorded onto a voice module 120 to accompany a gift, card or other product delivered to a recipient. At any point after the file is so stored, a clerk or other operator, or the customer if he or she is recording on-site, may download any such previously-recorded voice message onto a voice module using the recorder-imprinter.

Figure 11:
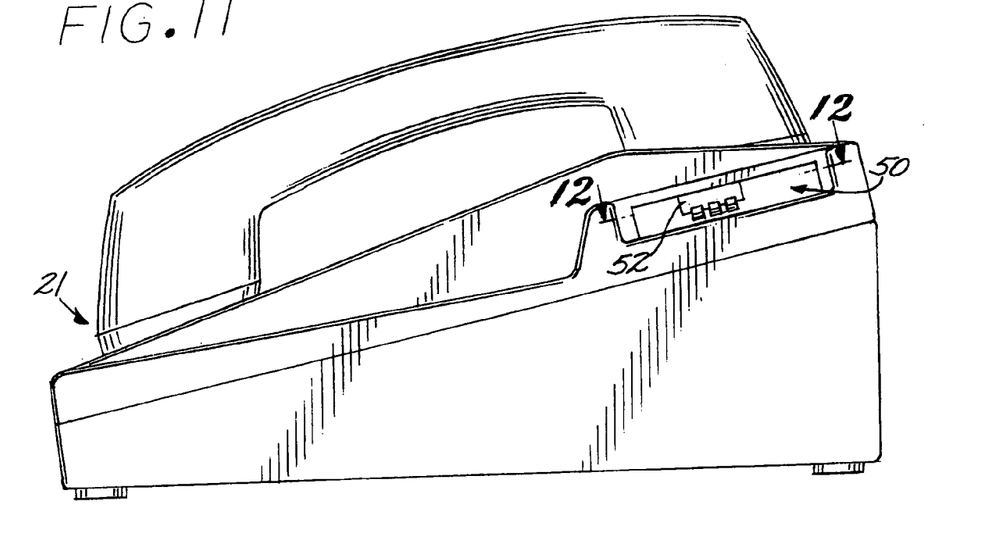
FIG. 11 is a right side view of the recorder-imprinter device of FIG. 1.

Referring now to FIGS. 11–13, the user may initiate this process by inserting a blank voice module into the interface port 50, causing the device to be automatically shifted into programming mode. Transfer of the voice message from the recorder-imprinter is achieved because the contact prongs of the female electrical receptacle 52 within the interface port are connected to the recorder-imprinter circuit and across the appropriate pins of the microprocessor 100 so that power and data can be shared across the contacts with the voice module, and the recorder-imprinter can thereby detect the voice module's insertion into the interface port. The interface port is further configured with side walls 54 and 55, an end wall 56 and a diagonal wall 58, or first indexer, between the end wall and the left side wall 54 so as to only complement the profile of the voice module when it is inserted in one way. Thus, as mentioned earlier, the configuration of the voice module, and particularly the diagonal wall 160 (FIGS. 7 & 8), or second indexer, of the voice module's casing 150, serves to orient and align the voice module in the interface port to insure proper mating and electrical contact between the port's female contact receptacle and the contact plates 134 of the voice module 120.

After inserting the voice module 120 into the interface port 50, the recorder-imprinter 21 will shift into its programming mode so that the user may scroll through the files currently stored in the RAM device 104 of the recorder-imprinter 21 using the up and down arrow buttons 36 and 38 on the numerical keypad 32 (FIG. 1). When the desired file is located, the user may press the selection button 30 under "PROG" on the display 28 to begin the transfer to the voice module. While the transfer is taking place, the recorder-imprinter will display a message indicating such. When the transfer is complete, the user will be prompted to remove the voice module from the recorder-imprinter by an appropriate message on the display 28.

Figure 14:
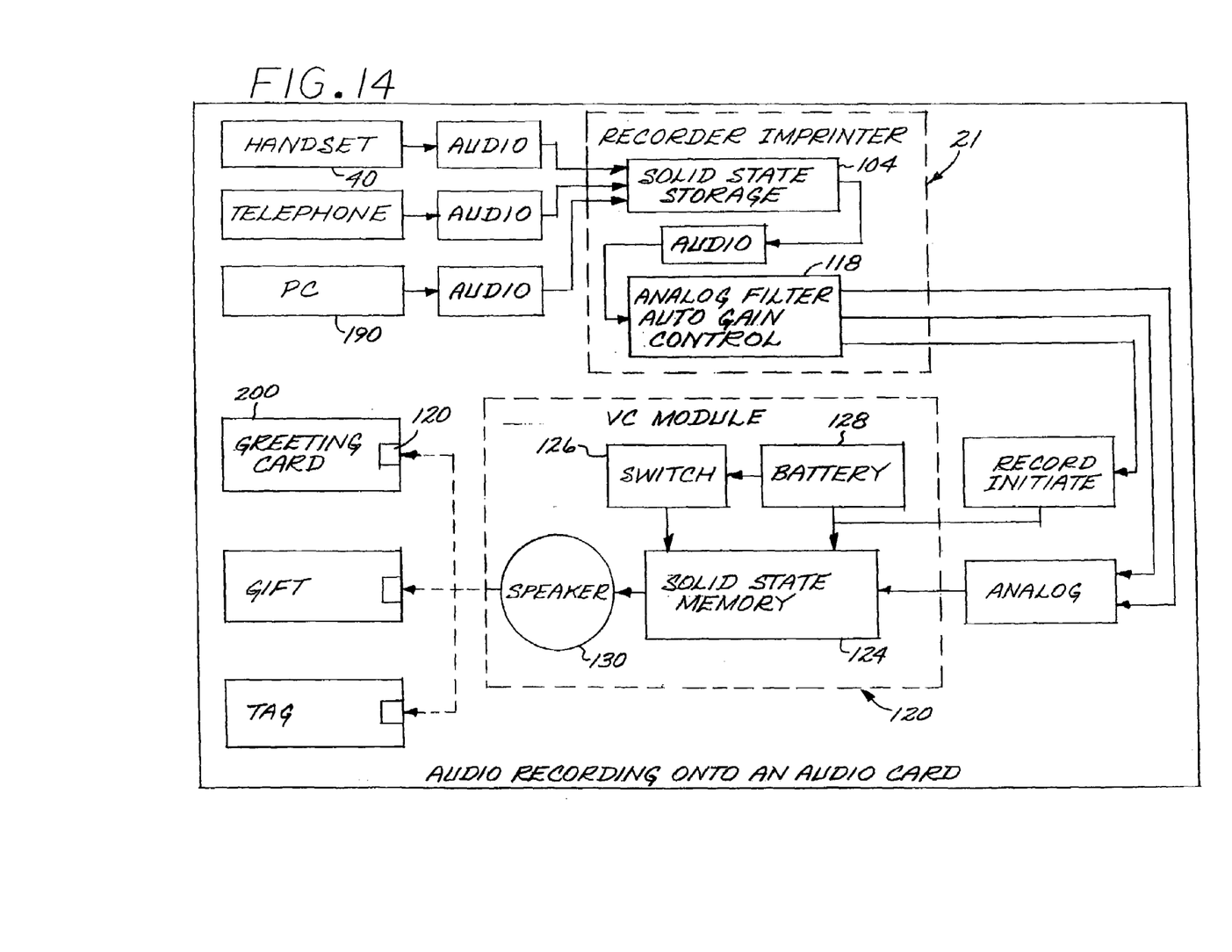
FIG. 14 is a schematic diagram depicting the steps for of electronically programming the voice module of FIG. 8 with an audio message.

Referring to the schematic shown in FIG. 14 depicting the overall flow of the audio greeting from the input device (remote telephone, handset or personal computer) through the primary components of the recorder-imprinter and into the solid state memory of the voice module 120, it will be appreciated that the personal voice message remains in analog format throughout the transfer and storage process to the voice module.

Figure 15:
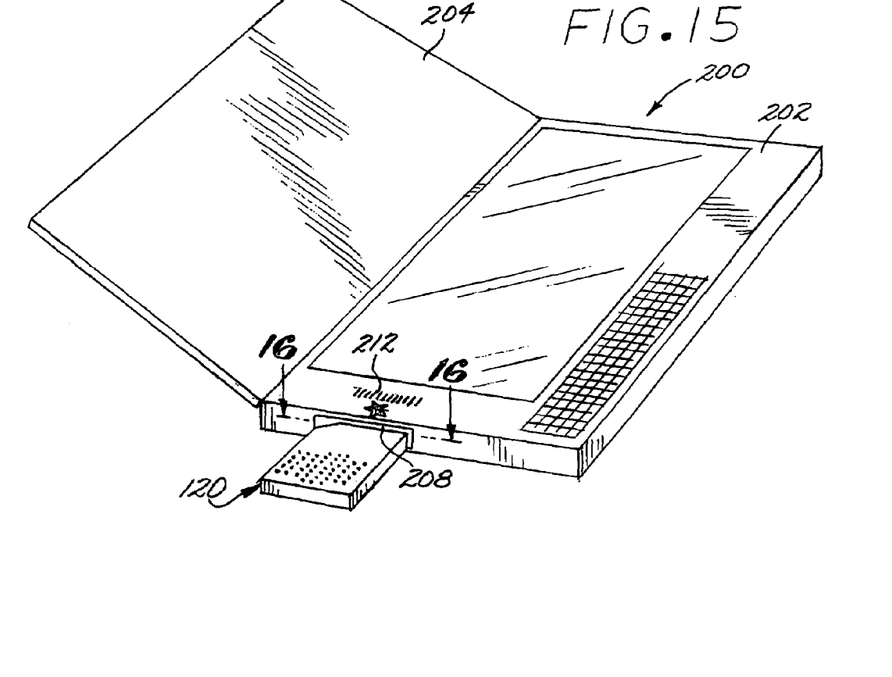
FIG. 15 is a perspective view in reduced scale showing the voice module of FIG. 8 being inserted in a greeting card.

The last step in the process of recording and sending a personal audio greeting according to the present invention, as shown in FIG. 14, is for the user to remove the recorded voice module 120 from the recorder-imprinter 21 and place it with the card, gift or other product being sent to the recipient. Referring to FIG. 15, a greeting card 200 embodying the present invention and exemplary of the type of greeting card that may be sent to a recipient along with a voice module generally includes a back 202 and a front flap 204. The back is approximately ¼" thick and consists of a lightweight foam or fiber core 206 with a finished, tighter-weave paper stock bonded to the outwardly-facing or otherwise exposed surfaces of the core. In this way, the card is still relatively light while retaining the functional integrity necessary to withstand the rigors of shipping, prolonged use and display by the proud recipient. The exterior paper surfaces provide the necessary material for printing and graphics to be cleanly transferred, such as the pre-printed, designed greeting and artwork on the card as purchased and any written message from the sender, should the sender be preparing the card himself or request assistance from another.

Figure 16:
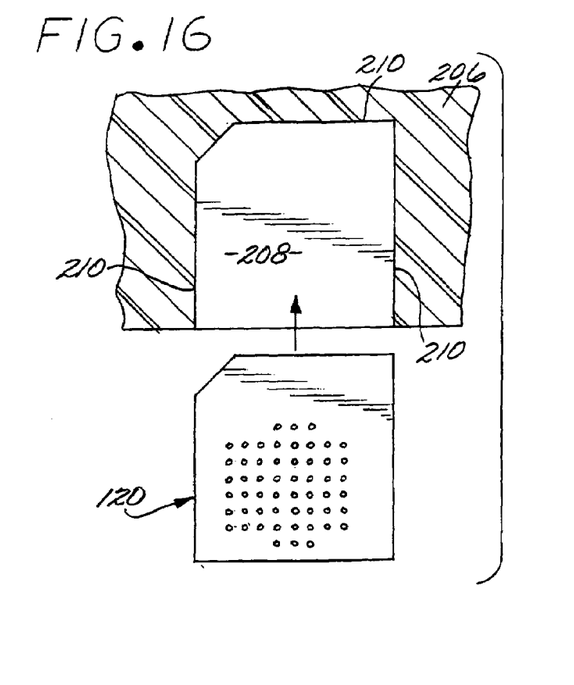
FIG. 16 is a sectional view, in enlarged scale and partially in section, taken along line 16—16 of FIG. 15.

Moreover, with reference now to FIG. 16, the construction of the back 202 also makes possible the formation of pocket 208 by pre-forming or cutting out a perimeter 210 in the core 206 so that when the paper stock is bonded to the core the pocket is formed. Furthermore, the pocket's perimeter is configured to match the profile of the voice module casing 150 (FIGS. 7 & 8), including the diagonal wall 160. In this way, the voice module 120 can only be fully inserted one way, insuring that the voice module is properly positioned within the card 200 and that the manual actuator 146 (FIG. 6) of the voice module will be adjacent to a corresponding marked area 212 on the card indicating where the recipient is to push or squeeze to initiate playback of the message. The card may also contain perforations or holes located adjacent the voice module's speaker 130 (FIG. 6) and hole pattern 154 (FIG. 7) to aid in the clear and audible playback of the voice message, further necessitating the proper orientation of the voice module within the greeting card. Finally, the card may be provided with a peel-off adhesive backing as is known in the art to facilitate attachment of the card to another item such as a gift, promotional product or business card. The voice module is retained within the pocket using tape, two-sided adhesive, friction or other closure means known in the art.

It will be appreciated by those skilled in the art that since the voice module is small and is a completely self-contained audio playback device, it can accompany a virtually unlimited number of cards, gifts, products and other packages. The versatility thus accorded the use of the voice module makes the audio message system of the present invention optimally configured for a wide variety of applications, even on a small budget.

Various modifications and changes may be made with regard to the foregoing detailed description without departing from the spirit of the invention.

What is claimed is:

1. A method of recording a personal message to present to a recipient including:

selecting a product with a pocket for receipt of a voice module of a predetermined configuration;

selecting a voice module of said predetermined configuration and of the type including an electrical contact, a solid state memory for receipt and storage of an analog signal applied to said contact, a power supply, a switch interposed between said power supply and said memory, and a speaker connected with said solid state memory and operable in response to said analog signal to generate an audio signal to propagate to said recipient;

selecting a recorder-imprinter device including a housing with a port configured to complementally receive said voice module and including an electrical receptacle engageable with said electrical contact, a storage device for receiving and storing said personal message, and a microprocessor in circuit with said receptacle and said storage device and operative in response to a stored said personal message to generate said analog signal;

relaying the personal message in real time directly from a customer to said storage device of said recorder-imprinter;

inserting said voice module in said port to engage said contact with said receptacle to receive said analog signal and record said analog signal on said solid state memory; and removing said voice module from said port and inserting said voice module in said pocket and delivering said product to said recipient.

2. The method of claim 1 further comprising:

placing a telephone call from a remote location over a conventional telephone network to a retail outlet as an incoming call;

receiving said telephone call;

connecting said telephone call to said recorder-imprinter device via a telephone signal port; and prompting the recording of said audio message using verbal commands over the telephone network from the recorder-imprinter device to the remote location.

3. The method of claim 2 further comprising:

configuring a personal computer at said retail outlet with an audio message recording software program;

selecting said recorder-imprinter to further include a computer interface separate from said telephone signal port;

linking said personal computer to said recorder-imprinter through said computer interface;

interacting said software program so as to store said voice message in said personal computer; and transmitting said voice message to said recorder-imprinter device.

4. The method of claim 3, wherein the step of interacting said software program further comprises:

placing a telephone call from a remote location over a conventional telephone network to a retail location; and in response to said telephone call transferring said telephone call to said personal computer.

5. The method of claim 3, wherein the linking step further comprises:

selecting a computer network means to facilitate the transmission of electronic data between electronic devices; and connecting said personal computer to said computer interface across said computer network means.

6. The method of claim 2, wherein the connecting step further comprises:

selecting a recorder-imprinter further including a telephone interface device in circuit between a telephone jack and said microprocessor;
selecting a telephone network;
installing a telephone line connection between said telephone network and said telephone jack; and
transferring said incoming call to said recorder-imprinter by pressing a selection button on said recorder-imprinter to cause said recorder-imprinter to automatically seize said incoming call.

7. The method of claim 1 further comprising:
locating a user and said recorder-imprinter in the same location;
selecting said recorder-imprinter to further include a handset in circuit with said microprocessor;
said user picking up said handset; and
said microprocessor prompting said user through said handset to record said voice message.

8. A method of recording a personal message to present to a listener receiving a gift including:
selecting a gift with a pocket for receipt of a voice module of a predetermined configuration;
selecting a voice module of said predetermined configuration, and of the type including an electrical contact, a solid state memory for receipt and storage of an analog signal applied to said contact, a power supply, a switch interposed between said power supply and said memory, and a speaker connected with said solid state memory and operable in response to said analog signal to generate an audio signal to propagate to said listener;
selecting a recorder-imprinter device including a housing with a port configured to complementally receive said voice module and including an electrical receptacle engageable with said electrical contact, a solid state analog storage device for receiving and storing an analog signal, and a microprocessor in circuit with said receptacle and said storage device and operative in response to a stored voice message to generate an analog signal;
receiving a telephone call from a customer and connecting said telephone call with said recorder-imprinter to record said personal message;
inserting said voice module in said port to engage said contact with said receptacle to receive said analog signal and record said analog signal on said solid state memory; and
removing said voice module from said port and inserting said voice module in said pocket and delivering said gift to said listener.

9. A method of recording a personal message to present to a recipient including:
selecting a voice module of the type including an electrical contact, a solid state memory for receipt and storage of an analog signal applied to said contact, a power supply, a switch interposed between said power supply and said memory, and a speaker connected with said solid state memory and operable in response to said analog signal to generate an audio signal to propagate to said recipient;
selecting a recorder-imprinter device including a housing having a telephone jack, a selection button and a connector engageable with said electrical contact, a storage device for receiving and storing said personal message, said connector and said storage device being operative in response to a stored said personal message to generate said analog signal, a microprocessor in circuit with said selection button, and a telephone interface device in circuit between said telephone jack and said microprocessor, said recorder-imprinter being located at a retail location;
selecting a telephone network;
installing a telephone line connection between said telephone network and said telephone jack;
placing a telephone call from a remote location over said telephone network to said retail location as an incoming call;
receiving said telephone call;
transferring said telephone call to said recorder-imprinter over said telephone line connection by pressing said selection button on said recorder-imprinter to cause said recorder-imprinter to automatically seize said telephone call through said telephone interface device;
prompting for said personal message;
storing said personal message in said storage device of said recorder-imprinter; and
engaging said electrical contact of said voice module with said connector of said recorder-imprinter to receive said analog signal and record said analog signal on said solid state memory for subsequent playback.

10. A method of recording a personal message to present to a recipient including:
selecting a voice module of the type including an electrical contact, a solid state memory for receipt and storage of an analog signal applied to said contact, a power supply, a switch interposed between said power supply and said memory, and a speaker connected with said solid state memory, said speaker being operable in response to said analog signal to generate an audio signal to propagate to said recipient;
selecting a first recorder-imprinter device including a housing with a computer interface device and a connector engageable with said electrical contact, a first storage device for receiving and storing said personal message, and a microprocessor in circuit with said computer interface device, said connector and said storage device being operative in response to a stored said personal message to generate said analog signal;
configuring a personal computer with an audio message recording software program;
linking said personal computer to said first recorder-imprinter through said computer interface device to store personal messages received by said recorder-imprinter;
interacting said software program so as to store said personal message received by said recorder-imprinter in said personal computer;
downloading said personal message to said first storage device of said first recorder-imprinter; and
engaging said electrical contact of said voice module with said connector of said first recorder-imprinter to receive said analog signal and record said analog signal on said solid state memory for subsequent playback.

11. The method of claim 10, wherein said step of interacting said software program further comprises:
co-locating a user and said personal computer;
configuring said personal computer with a microphone for audible receipt of said personal message; and
running said software program so as to prompt said user through the storing of said personal message.

12. The method of claim 11, wherein:
said personal computer and said first recorder-imprinter are located at a first retail location.

13. The method of claim 11, wherein:
said first recorder-imprinter is located at a first retail location; and said personal computer is located at a remote location.

14. The method of claim 10, wherein said step of interacting said software program further comprises:
co-locating a user and said personal computer; and
running said software program so as to allow said user to initiate said step of downloading a stored said personal message to said first recorder-imprinter.

15. The method of claim 10, wherein:
said first recorder-imprinter is located at a first retail location;

a second recorder-imprinter is located at a second retail location, said second recorder-imprinter including a second storage device having said personal message stored therein; and
said step of interacting said software program further includes uploading said personal message from said second recorder-imprinter to said personal computer.

16. The method of claim 15, wherein:
said personal computer is located at a remote location.

17. The method of claim 15, wherein:
said personal computer is located at said first retail location.

* * * * *